Nov. 24, 1970  T. O. PAINE, ACTING  3,543,050
ADMINISTRATOR OF THE NATIONAL AERONAUTICS
AND SPACE ADMINISTRATION
PEAK POLARITY SELECTOR

Filed Oct. 30, 1968  2 Sheets-Sheet 1

*INVENTOR.*
STEPHEN K. SHEPARD

BY
ATTORNEY

United States Patent Office 3,543,050
Patented Nov. 24, 1970

3,543,050
PEAK POLARITY SELECTOR
T. O. Paine, Acting Administrator of the National Aeronautics and Space Administration, with respect to an invention of Stephen K. Shepard, Pasadena, Calif.
Filed Oct. 30, 1968, Ser. No. 771,937
Int. Cl. H03k 5/20
U.S. Cl. 307—235                                                12 Claims

ABSTRACT OF THE DISCLOSURE

Apparatus is disclosed for monitoring an alternating signal, such as an electrocardiograph waveform, to select the polarity of greatest peak amplitude with respect to a specified DC level and to transmit to a utilization device, such as a cardiotachometer, only that part of the waveform above or below that level which has the greatest peak amplitude. A signal presence detection circuit enables the peak polarity selection to be made automatically by comparing the absolute values of peak voltages of the two polarities and setting a flip-flop accordingly. The flip-flop then selectively enables an output switch for transmitting to an output terminal the polarity of greatest amplitude, but inverted if necessary to provide an output signal with a predetermined polarity.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

This invention relates to a peak polarity selector and more particularly to a system for monitoring a waveform in order to transmit, with a predetermined polarity, that part of the waveform above or below a specified DC level which has the greatest peak amplitude.

(2) Description of the prior art

There are many applications for instruments having input electrodes required to be connected to a signal source with a particular polarity in order to facilitate monitoring or analyzing the signal. For instance, in cardiac instrumentation, it is desirable to monitor an electrocardiograph signal for a variety of reasons, either directly from the subject or from a magnetic tape record.

Each cycle of the electrocardiograph signal includes a distinctive QRS complex comprising two small peaks of one polarity referred to as the Q and the S waves, and a larger peak of the opposite polarity referred to as the R wave. Other waves of the same polarity as the R wave will occur, but with lower peak amplitudes so that it would be feasible to bias an amplifier for transmission of only the R wave. That would be useful in developing a synchronizing signal for processing the entire electrocardiograph record. However, if an amplifier is so biased, care must be taken to connect the electrodes to the subject or magnetic tape record such that the electrocardiograph signal is applied to the amplifier with the proper polarity. Otherwise the Q and the S waves of the other polarity may be transmitted to produce either double synchronizing pulses or, more likely, unreliable generation of synchronizing pulses. Therefore, it would be desirable to have a peak polarity selector in the electrocardiograph signal channel so that only part of the waveform above or below a specified DC level is transmitted to the synchronous pulse generator or other utilization device with a predetermined polarity regardless of how the electrodes are connected to the subject or the magnetic record.

OBJECTS AND SUMMARY OF THE INVENTION

A primary object of the present invention is to provide a system for monitoring an unsymmetrical waveform and for automatically transmitting only that part of a waveform above or below a specified DC level which has a predetermined peak amplitude relation to the other, such as greatest peak amplitude.

Another object is to provide a system for generating a pulse of a predetermined polarity and amplitude from the R wave of a cardiac QRS complex regardless of the polarity of the R wave.

Still another object is to provide a system for detecting the presence of a periodic signal.

Yet another object is to provide a buffered system for switching to a common channel a selected one of two signals.

These and other objects are achieved in apparatus by separate means for detecting and storing the peak absolute amplitude of each polarity of an input waveform with respect to a reference level. A comparator connected to both peak storage means sets or resets a flip-flop according to which means is storing a voltage signal of greatest absolute amplitude. The complementary output signals from the flip-flop actuate a pair of polarity selecting switches such that only one will transmit an output signal over a common output channel at any given time. One switch is connected to transmit that part of the input waveform below a reference level in inverted form while the other is connected to transmit that part of the waveform above the reference level in uninverted form. In that manner, the part of the input signal having peak signals of greatest absolute amplitude is transmitted with a predetermined polarity. Alternatively, the system may be readily adapted to transmit only that part of the input signal having peak signals of lowest absolute amplitude by reversing the connections of the flip-flop to the gates.

Means for detecting the presence of a signal is provided to trigger the flip-flop in order that peak polarity selection be made automatically within a few cycles after the input signal is known to be present. The signal-presence detecting means comprises an integrating capacitor connected to receive pulses of a predetermined polarity in response to peak signals of the input signal. In a preferred embodiment, the pulses are derived by detecting the peaks of the signal transmitted by the polarity selecting gates, and triggering a monostable multivibrator with those peaks in order that the signal-presence detecting integrator receive a pulse of uniform amplitude and width in response to each peak detected. Several pulses must be integrated before a threshold switch with predetermined hysteresis triggers the flip-flop. If the signal is lost, the integrating capacitor will start to discharge, and after it fails to receive pulses for a period determined by its RC time constant, the threshold switch will be reset. However, the peak polarity selection made by the flip-flop is left unaltered until the presence of an input signal is again detected, whereupon the flip-flop will again be triggered to a state which corresponds to the greatest voltage output of the two peak storage means.

Each peak storage means comprises a capacitor which is preferably discharged completely upon one cycle of the input signal not being present. That is accomplished by an arrangement in which the peak storage means are continually reset while no signal is present. Once a signal is present of sufficient amplitude to cause the multivibrator to be triggered, the process of continually resetting the peak storage means is discontinued. If the multivibrator is not triggered for a period which exceeds the longest expected period of the input signal, the peak storage means are again immediately discharged.

The pair of polarity selecting switches actuated by the flip-flop comprises first and second transistors of a given conductivity type connected to a common collector resistor by separate buffer diodes, and third and fourth transistors of opposite conductivity. The third transistor has its collector connected directly to the collector of the first transistor and its emitter connected directly to the supply voltage (circuit ground) for the common collector resistor. The fourth transistor has its collector connected directly to the collector of the second transistor and its emitter connected directly to the same supply voltage. Accordingly, while the third transistor is turned on by a control signal on its base, the input signal at the base of the first transistor is shunted to the supply voltage. Similarly, while the fourth transistor is turned on by a separate control signal, the input signal at the base of the second transistor is shunted. The control signals are complementary output signals of the flip-flop. In that manner, only one of the input signals at the base of the first and second transistors is transmitted in inverted form at any given time.

The novel features of the invention are set forth with particularity in the appended claims. The invention will best be understood from the following description when read in conjunction with the accompanying drawings.

DESCRIPTION OF THE PREFERRED EMBODIMENTS

The embodiment of the invention specifically disclosed herein is adapted for use in a cardiac instrumentation. However, it should be understood that the teachings of the invention are equally applicable to other requirements for instrumentation involving unsymmetrical waveforms. Moreover, it should be appreciated that although the invention specifically disclosed is adapted to select for transmission that half of the input signal waveform having the greatest peak amplitude, the polarity selection may be modified to transmit that half of the waveform having the smallest amplitude, depending upon the environment or the specific operating requirements of the instrument employing the invention. It should be further appreciated that although particular configurations for most of the operating circuits are shown, other configurations may be employed.

Figure 1:
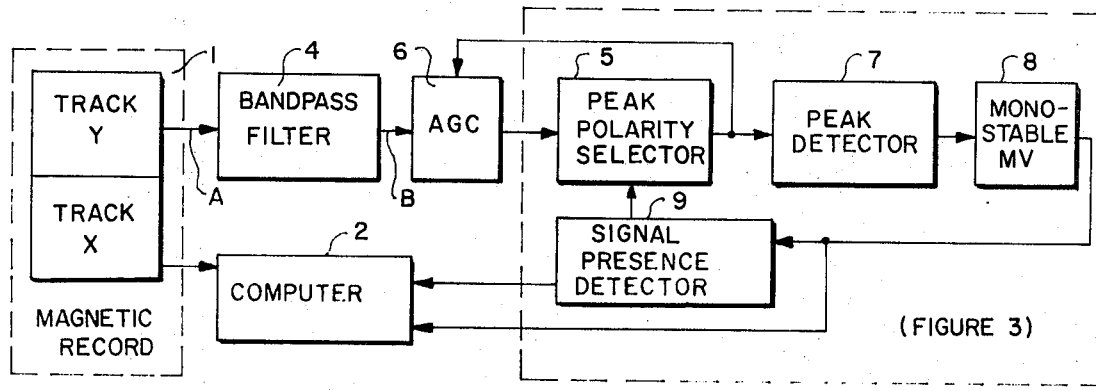
FIG. 1 is a block diagram of cardiac synchronous pulse generator employing the present invention.

Referring now to FIG. 1, the cardiac instrumentation contemplated involves recording an EKG signal on track X of magnetic tape 1 and processing the recorded signal to obtain a noise free waveform of one cardiac cycle. Recognizing that noise is random, a noise-free waveform of one cardiac cycle may be obtained (without the distortion produced by filtering techniques) by the simple expedient of averaging a number of cycles (about 50 or more) of the recorded EKG signal in a computer 2. To synchronize the computer 2 with the cycles of the recorded signal, the same EKG signal is recorded on track Y of the tape and processed to produce synchronizing pulses. Due to a finite delay in producing synchronizing pulses, the record and playback system of track Y is adjusted relative to the system of track X such that the waveforms from track Y will lead the waveforms from track X by an amount sufficient to compensate for that delay.

Figure 2:
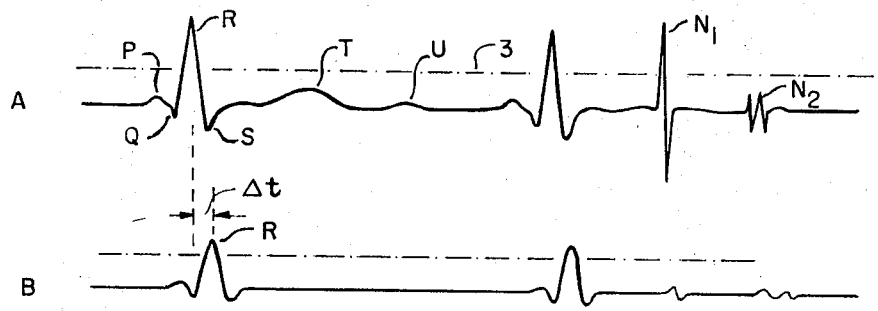
FIG. 2 is a waveform diagram of an electrocardiograph signal with noise and of the electrocardiograph signal filtered to attenuate noise.

FIG. 2 illustrates in waveform A two cycles of an EKG signal. The first is shown in an ideal form to point out the characteristic QRS complex of peaks in one cycle. Other peaks P, T, and U are also of some interest to cardiologists and researchers. For the purpose of synchronizing instrumentation, it is common practice to use the peak of greatest magnitude, but that would not be possible without filtering noise since such noise may be of equal or greater amplitude. For example, if a threshold device, such as a Schmitt trigger circuit, is biased to trigger only on peak waves greater than a predetermined amplitude represented by a dotted line 3, a noise peak $N_1$ may also trigger the device. Only noise peaks of lower amplitude, such as peak $N_2$, would be eliminated.

If the waveform A were to be filtered to attenuate the noise, the waveform B would be produced with only the R wave exceeding the threshold level. The R wave may then be reliably used to produce synchronizing pulses if the delay $\Delta t$ is compensated. That delay is a function of the center frequency of the R wave, the center frequency of the filter and the transmission delay through the filter. FIG. 1 shows such a filter 4, a narrow band pass filter with a preamplifier if needed and a center frequency of about 17 Hz. However, the output of the filter can not be applied directly to the threshold device to produce R-triggered pulses, even with post amplification unless it is first determined that the input signal polarity is such that the R wave is of the same polarity as the threshold bias level 3 (FIG. 2). Since the EKG signal recorded on the magnetic tape 1 may be of either polarity, a peak polarity selector 5 is coupled to the filter 4 by an automatic-gain-control (AGC) means 6.

The peak polarity selector 5 transmits to a threshold detector 7 the positive part, or the negative part inverted, of the recorded waveform, depending upon which has peak waves of greatest amplitude. In that manner, the peak detector 7 receives the R waves which exceed a minimum threshold value and triggers a monostable multivibrator 8. The output of the monostable multivibrator is then applied to the computer 2 as a train of synchronizing pulses. It is also applied to a signal presence detector 9 which signals to the peak polarity selector 5 that a signal from track Y is present, as evidenced by the monostable multivibrator 8 having been triggered, but not until it has been so triggered several times by peaks of either polarity of the waveform B as shown in FIG. 2 or inverted.

It should be noted that the peak polarity selector 5 transmits a feedback signal to the AGC means 6 so that if the input signal is of the waveform B inverted, the filtered waveform will be amplified sufficiently to provide an output to trigger the multivibrator 8. Accordingly, regardless of the polarity of the input signal to the polarity selecting system comprising the peak detector 7, multivibrator 8, signal presence detector 9 and peak polarity selector 5, pulses are applied to the signal presence detector 9 which, after several cycles, enables the polarity selector 5 to select that part of the input signal waveform having greatest peak amplitudes with respect to a predetermined reference level. The signal presence detector 9 may also signal to the computer that averaging cycles of the waveform may commence because once the peak polarity selection is made, the synchronizing pulses are generated by triggering the multivibrator 8 with the R wave. The polarity selection made is remembered by the peak polarity selector 5 in the event the input signal is lost. If the input signal is lost only momentarily, synchronous pulse generation resumes when the signal is restored without any change. In the meantime, it may be possible for the operation of the computer to continue without intolerable drift. However, if the signal is lost for a longer period of time, the signal presence indication from the detector 9 ceases to be transmitted and the operation of the computer may be either terminated or suspended. Meantime, the polarity selector is prepared to make a new peak polarity selection when there is a signal present again.

Figure 3:
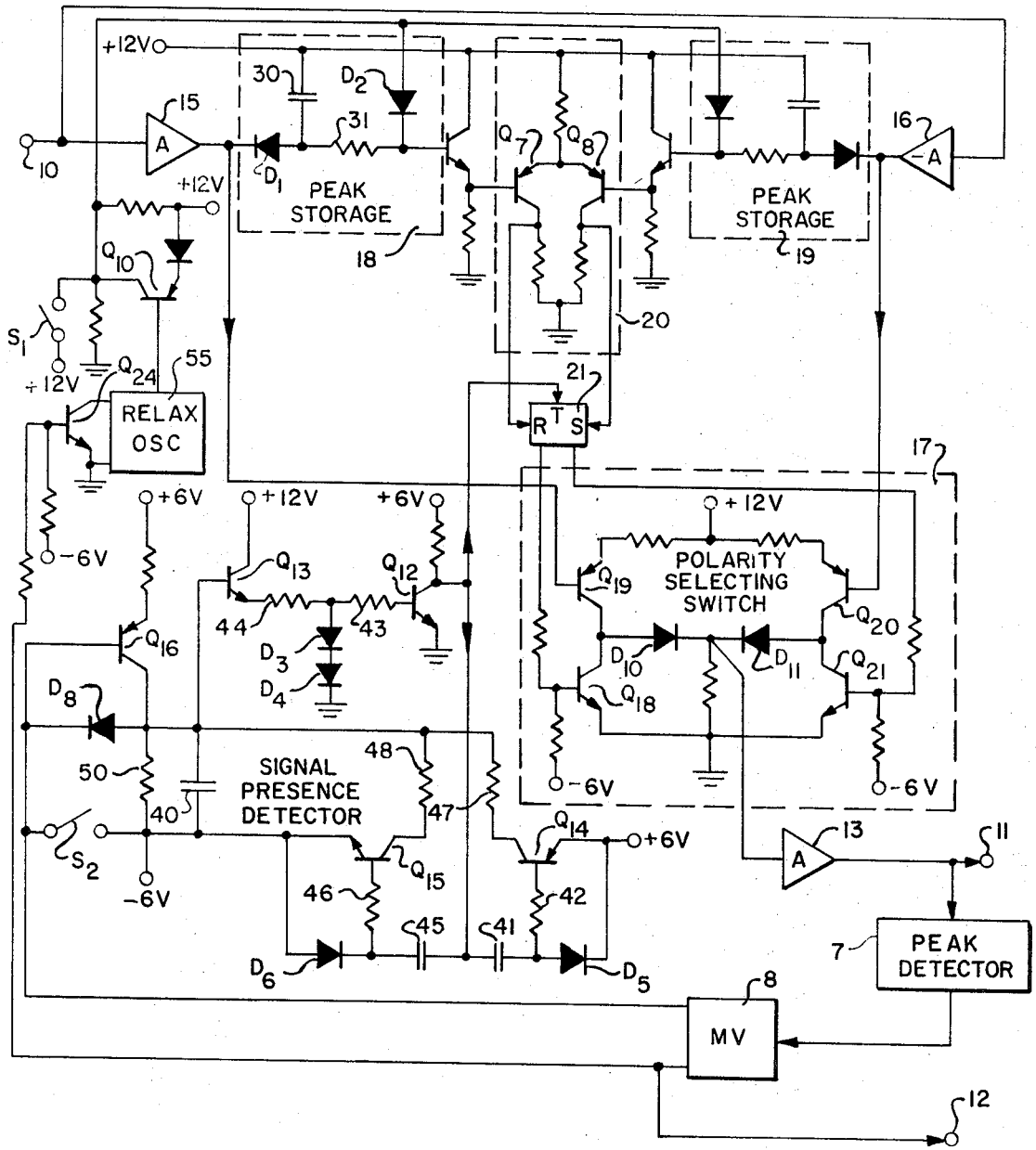
FIG. 3 is a schematic diagram of a preferred embodiment of the invention.

The peak polarity selector 5 and signal presence detector 9 will now be described with reference to FIG. 3 which shows an input terminal 10 adapted to be connected to the output of the AGC means 6 (FIG. 1) and an output terminal 11 adapted to be connected to the gain-control terminal of the AGC means 6. The threshold peak detector 7 and multivibrator 8 are shown in FIG. 3 in the same functional block form as in FIG. 1.

From the foregoing description of FIG. 1, it may be seen that reliable triggering of the multivibrator 8 via the threshold peak detector 7 requires that an amplifier 13 have connected at its input terminal the amplified positive half of waveform B shown in FIG. 2 and not the inverted negative half. If the amplified and inverted waveform is present at the input terminal 10, it is then necessary to selectively couple to the input terminal of the amplifier 13 its negative half via a non-inverting amplifier 15 (instead of an inverting amplifier 16), and a polarity selecting switch section 17. To accomplish that, a negative peak storage means 18 is connected to the output of the amplifier 15 while a negative peak storage means 19 is connected to the output terminal of the inverting amplifier 16. Accordingly, the peak storage means 18 detects and stores the negative peak while the peak storage means 19 detects and stores the positive peak of a waveform, but both peak amplitudes are stored as negative voltages (owing to the inversion in amplifier 16) for comparison. The non-inverting amplifier should, of course, be balanced with the inverting amplifier 16 with respect to gain.

A comparator 20 then sets or resets a triggered RS flip-flop 21, depending upon which peak storage means has the largest negative charge stored therein i.e., which half of the waveform has the greatest peak amplitude. As shown in FIG. 2, the positive half has the greatest peak amplitude. Accordingly, the positive half of the waveform inverted by the amplifier 16 and stored by the peak storage means 19 will set the flip-flop 21 through the comparator 20 in order that the polarity selection made by the switch section 17 is that part of the input waveform present at the output of the amplifier 16.

Each of the peak storage means 18 and 19 comprises an integrating capacitor 30 having one terminal connected to a source of +12 volts and the other terminal adapted to receive only negative signals through a blocking diode $D_1$. The output of each peak storage means is coupled to an input terminal of the comparator 20 by an emitter follower in order to provide a high input impedance for the discharge path of the storage capacitor 30. A second diode $D_2$ is connected to the storage capacitor 30 and poled for discharge thereof when the anode of the diode $D_2$ is connected to a source of +12 volts by a manually operated switch $S_1$ or an electronic switch comprising a PNP transistor $Q_{10}$. A small resistor 31 is connected between the storage capacitor 30 and the diode $D_2$ to protect the junction of the transistor $Q_{10}$, and to prevent arcing across the contacts of the switch $S_1$ when it is closed. It also protects the diode $D_2$ against excessive current.

The comparator 20 comprises a pair of transistors $Q_7$ and $Q_8$ connected in a conventional common emitter-resistor configuration. The collector of each transistor is connetcted to an input terminal of the flip-flop 21. However, the flip-flop 21 is not set or reset regardless of the difference between voltages stored by the respective peak storage means 18 and 19 until a signal applied to its trigger input terminal by a signal-presence detection means changes from +6 volts to substantially 0 volts as transistor $Q_{12}$ of the NPN-type is turned on. For example, if the signal present at the input terminal 10 is the amplified form of the waveform B shown in FIG. 2, the negative output signal of the amplifier 16 would be greater in peak amplitude than the negative output of the amplifier 15. Accordingly, the set input terminal of the flip-flop 21 would be driven toward +12 volts while the reset input terminal would be driven toward circuit ground. Consequently, once the signal-presence detection means turns transistor $Q_{12}$ on, the flip-flop 21 is triggered to the correct state if not already in that state.

The flip-flop 21 in turn actuates the polarity selecting switch section 17 to cause it to invert and transmit to the input terminal of the amplifier 12 the output signal at the output terminal of the amplifier 16. Since the set input terminal of the flip-flop 21 must have a significantly more positive voltage applied thereto in order for the flip-flop 21 to be triggered into its set state, the voltage stored by the peak storage means 19 must be significantly more negative than the voltage stored by the peak storage means 18. For greater sensitivity in the setting and resetting of the flip-flop 21 in accordance with the relative peak amplitudes of the positive and negative parts of the input signal, a second differential amplifier stage may be provided to further amplify even a small difference between the voltages stored by the peak storage means 18 and 19.

Transistor $Q_{12}$ is turned on upon a transistor $Q_{13}$ also of the NPN-type being turned on when an integrating capacitor 40 is sufficiently charged in response to peaks at the output of amplifier 13 detected by the threshold peak detector 7 and converted into uniform pulses by the multivibrator 8. The level change at the collector of transistor $Q_{12}$ turns on a PNP transistor $Q_{14}$ for a period of time determined by the RC time constant of a capacitor 41 and a resistor 42. In that manner, the transistor $Q_{14}$ conducts to fully charge the capacitor 40 once the transistor $Q_{12}$ is turned on in order to prevent erratic action due to the charge on the capacitor 40 being near the turn-on threshold level for transistor $Q_{13}$ such that it may switch on and off several times before the capacitor 40 becomes more fully charged to hold it on.

Should the input signal be lost or otherwise cease to have sufficient amplitude to be detected, the voltage on the capacitor 40 will discharge to the point where transistor $Q_{13}$ will no longer conduct. Transistor $Q_{12}$ will then have its base connected to the same potential (circuit ground) as its emitter through a resistor 43 and diodes $D_3$ and $D_4$. Otherwise, while transistor $Q_{13}$ is conducting, the base of the transistor $Q_{12}$ is connected to a positive potential established by the voltage-dividing network comprising the transistor $Q_{13}$ connected to +12 volts, a resistor 44, and diodes $D_3$ and $D_4$ connected to circuit ground. In that manner, the voltage drop across two diodes connected in series is employed to speed up the turning on of transistor $Q_{12}$, thereby insuring a sharp leading edge for the trigger signal transmitted to the flip-flop 21. That is because the first few microamperes of current through transistor $Q_{13}$ will cause enough voltage drop across the diodes to turn the transistor $Q_{12}$ on.

Once the input signal is lost and the transistor $Q_{12}$ has been cut off, the positive-going step voltage at its collector is coupled by a capacitor 45 to the base of NPN transistor $Q_{15}$ to momentarily turn it on (for a period determined by the RC time constant of the capacitor 45 and a resistor 46), and thereby discharge the capacitor 40. Diodes $D_5$ and $D_6$ protect the base-emitter junctions of the transistors $Q_{14}$ and $Q_{15}$ against excessively positive and negative voltage excursions, respectively, as the transistor $Q_{12}$ is turned on and off, while resistors 47 and 48 are provided to establish the rate at which the capacitor 40 may be charged and discharged by conduction through the transistors $Q_{14}$ and $Q_{15}$ respectively.

A resistor 50 connected in parallel with the integrating capacitor 40 is selected to provide the desired integrating time constant, which should be several cycles of the waveform illustrated in FIG. 2. Although the signal at the output terminal 11 could be applied directly to the base of a PNP transistor $Q_{16}$ to charge the capaictor 40, it is preferred to apply the output signal at terminal 11 to the multivibrator 8 via the threshold peak detector to derive pulses of uniform width and amplitude in order that a more precisely predetermined number of cycles of the input signal be present before the transistor $Q_{12}$ is switched on, thereby triggering the RS flip-flop 21. If the monostable multivibrator 8 is triggered at a rate below the lowest heart rate anticipated, the capacitor 40 will discharge sufficiently through the resistor 50 to turn transistors $Q_{12}$ and $Q_{13}$ off. When pulses again trigger the monostable multivibrator 8 at a rate sufficiently high to indicate the presence of an input signal, the capacitor 40 will become sufficiently charged to turn transistors $Q_{12}$ and $Q_{13}$ on, thereby once again triggering the flip-flop 21 to a state corresponding to the output of the comparator 20.

A diode $D_8$ is connected between the collector and base electrodes of the transistor $Q_{16}$ in order to provide a discharge path for the capacitor 40 when the switch $S_2$ is closed for manual resetting. In practice, both switches $S_1$ and $S_2$ would be linked together, so that when the switch $S_1$ is close to discharge the capacitors of the peak storage means 18 and 19, the switch $S_2$ would also be closed to discharge the integrating capacitor 40.

The capacitor 30 of each of the peak storage means 18 and 19 is also discharged through diode $D_2$ by transistor $Q_{10}$ as noted hereinbefore. That is accomplished by a relaxation oscillator 55, such as a unijunction transistor oscillator which momentarily turns on transistor $Q_{10}$ periodically if positive pulses are not being transmitted by the monostable multivibrator 8, which is if the presence of a signal is not detected. The period of the relaxation oscillator established by the RC time constant of a capacitor and resistor thereof is chosen to be longer than the expected quiet periods during normal continuous signal conditions, i.e., longer than the longest expected cardiac cycle of a subject.

A transistor $Q_{24}$ of the NPN-type is connected as a switch across the timing capacitor of the relaxation oscillator such that the capacitor is discharged each time a positive pulse is transmitted by the monostable multivibrator 8. In that manner, the relaxation oscillator is caused to reinitiate its timing period before turning transistor $Q_{10}$ on each time a cardiac cycle is detected. If the peak detector 7 fails to detect a given cardiac cycle, either because the signal has been lost or the R wave of that cycle was not of sufficient amplitude, the monostable multivibrator 8 will not be triggered. Accordingly, pulses will not be applied to the base electrodes of transistors $Q_{16}$ and $Q_{24}$. The relaxation oscillator 55 will then reach the end of its timing period and transmit a short pulse to the base of the transistor 10. The latter is momentarily turned on to remove all charge from each of the peak storage means 18 and 19. At the same time, the capacitor 40 will begin to discharge through the resistor 50.

If a predetermined number of cardiac cycles are missed, the capacitor 40 will discharge sufficiently to turn transistors $Q_{12}$ and $Q_{13}$ off thereby momentarily turning on transistor $Q_{15}$ to more fully discharge the capacitor 40 as noted hereinbefore. The peak storage means 18 and 19 are also fully discharged. When the presence of an input signal is again detected, and the multivibrator 8 is triggered, the operation of the oscillator 55 is arrested and the peak storage means 18 and 19 are again charged. After several cycles, the capacitor 40 is also sufficiently charged to turn on transistor $Q_{12}$. Immediately upon the transistor $Q_{12}$ being turned on, the flip-flop 21 is triggered to set it in the state corresponding to the peak polarity determination made by the comparator 20. The polarity selecting switch section 17 responds immediately to any change in the state of the flip-flop 21 to transmit to the amplifier 13 the half of the input signal having the greatest peak amplitude from either the amplifier 15 for the negative half and inverting amplifier 16 for the positive half.

The polarity-selecting switch section 17 is comprised of a switching transistor $Q_{18}$ of the NPN-type which shunts the output of an inverting amplifier (PNP transistor $Q_{19}$) to ground by the output of the flip-flop 21 while it is reset. An inverting amplifier (PNP transistor $Q_{20}$) has its output shunted to ground by a switching transistor $Q_{21}$ of the NPN-type while the flip-flop 21 is in the set state. Diodes $D_{10}$ and $D_{11}$ isolate the switching transistor associated with each of the inverting amplifier transistors $Q_{19}$ and $Q_{20}$ from each other. For instance, assuming the amplified form of the waveform B of FIG. 2 to be present at the input terminal 10, the peak storage means 19 will cause the flip-flop 21 to be set via the comparator 20 thereby switching transistor $Q_{18}$ on to shunt the output of the transistor $Q_{19}$ to ground. The switching transistor $Q_{21}$ remains cut off so that the output of the inverting amplifier 16 is inverted by the transistor $Q_{20}$ and transmitted via diode $D_{11}$ to the amplifier 13. Under those conditions, the anode of the diode $D_{10}$ is at circuit ground while the junction between the two diodes $D_{10}$ and $D_{11}$ is at some positive potential. Consequently, the diode $D_{10}$ is reverse biased while the switching transistor $Q_{18}$ is turned on.

What is claimed is:

1. In a system for monitoring a period waveform at an input terminal that is not symmetrical in both polarities with respect to a reference and for automatically transmitting to an output terminal only that polarity of said waveform having a predetermined peak absolute amplitude relation to the other, the combination comprising:

first and second means connected to said input terminal for detecting and storing the peak absolute amplitude of each half of an input waveform;

a comparator connected to said first and second means for determining which means is storing a peak absolute amplitude having said predetermined relation to the other;

a flip-flop responsive to said comparator for being set in a given one of two states in accordance with the determination made by said comparator; and switching means responsive to said flip-flop for transmitting to said output terminal only that polarity of said waveform having said predetermined relation to the other as determined by said comparator.

2. The combination as defined in claim 1 wherein said switching means transmits either polarity of said waveform in response to said flip-flop with a predetermined polarity.

3. The combination as defined in claim 2 wherein said flip-flop is of a type having an input terminal adapted to receive a trigger signal before it will be triggered from one state to another in response to said comparator, the combination further comprising means for detecting the presence of a signal at said system input terminal, and in response thereto for transmitting to said flip-flop a trigger signal.

4. The combination as defined in claim 3 wherein said signal-presence detecting means comprises:

a threshold peak detector connected to said output terminal for detecting when the peak of each signal wave at said output terminal exceeds a predetermined threshold value;

a transistor connected to said trigger input terminal of said flip-flop for producing said trigger signal when actuated in response to a predetermined voltage signal;

an integrating means for actuating said transistor in response to a plurality of input pulse integrated to provide said voltage signal, said integrating means having a predetermined time constant, whereby input pulses must be received at a predetermined average rate to be able to provide said voltage signal, and thereafter to able to continue to provide said voltage signal; and means for transmitting pulses to said integrating means, one pulse for each input signal wave exceeding said predetermined threshold value as detected by said threshold peak detector.

5. The combination as defined in claim 4 wherein said last named means comprises a monostable multivibrator, whereby the number of said plurality of input pulses required to be integrated to provide said voltage signal may be predetermined.

6. The combination as defined in claim 4 further comprising:
an automatic gain control means coupling said unsymmetrical waveform to said system input terminal for varying the gain in response to the amplitude of the signal at said output terminal.

7. The combination as defined in claim 6 wherein said means for transmitting pulses to said integratting means comprises a monostable multivibrator, whereby the number of said plurality of input pulses required to be integrated to provide said voltage signal may be predetermined.

8. The combination as defined in claim 4 including means connected to said threshold peak detector for discharging said first and second means during each predetermined period that said threshold peak detector does not detect a wave at said output terminal, said predetermined period being greater than one period of said unsymmetrical waveform at the system input, but less than two periods thereof.

9. The combination as defined in claim 8 wherein said means for discharging said first and second means comprises a relaxation oscillator and means for reinitiating the cycle of operation of said relaxation oscillator in response to each wave detected by said threshold peak detector, whereby no charge is removed from said first and second means during successive periods of said periodic waveform at said system input terminal that waves thereof are detected by said threshold detecting means.

10. The combination as defined in claim 4 wherein said signal presence detecting means further comprises means responsive to said transistor for quickly charging said integrating means to a predetermined maximum when actuated thereby, and means responsive to said transistor for quickly discharging said integrating means to a predetermined minimum when deactuated immediately upon said voltage signal no longer being provided.

11. The combination as defined in claim 1 wherein said switching means comprises:
first and second transistors of a given conductivity type, each having its collector coupled to a common collector load resistor by a separate buffer diode, and each having its base adapted to receive an input signal of the same polarity;
means for coupling half of said waveform at said system input terminal of a given polarity to the base of one of said first and second transistors for amplification and inversion;
means for coupling the other half of said waveform at said system input terminal in inverted form to the base of one of said first and second transistors for amplification and inversion;
a third transistor having its collector-to-emitter circuit connected in parallel with said load resistor in series with said buffer diode coupling said load resistor to the collector of said first transistor;
a fourth transistor having its collector-to-emitter circuit connected in parallel with said load resistor in series with said buffer diode coupling said load resistor to the collector of said second transistor;
means coupling the base of said third transistor to a first output terminal of said flip-flop; and
means coupling the base of said fourth transistor to a second output terminal of said flip-flop complementary to said first output terminal.

12. The combination as defined in claim 11 wherein said flip-flop is of a type having an input terminal adapted to receive a trigger signal before it will be triggered from one state to another in response to said comparator, the combination further comprising means for detecting the presence of a signal at said system input terminal, and in response thereto for transmitting to said flip-flop a trigger signal.

References Cited
UNITED STATES PATENTS 3,138,763    6/1964    Hendrickson ____ 307—235 XR
3,248,560    4/1966    Leonard _____ 307—235 XR
3,287,570    11/1966    Wilson _____ 307—235

OTHER REFERENCES

Gardner: Tristable Threshold Circuit, I.B.M. Technical Disclosure Bulletin, October 1966, pp. 528—529.

STANLEY T. KRAWCZEWICZ, Primary Examiner

U.S. Cl. X.R.

128—206; 328—116, 147, 150